United States Patent
Wang et al.

(10) Patent No.: US 10,122,623 B2
(45) Date of Patent: Nov. 6, 2018

(54) CONTROL DEVICE AND CONTROL METHOD IN SDN NETWORK

(71) Applicant: Huawei Technologies Co., Ltd., Shenzhen (CN)

(72) Inventors: Yongcan Wang, Shenzhen (CN); Ke Lin, Shenzhen (CN); Yingjun Tian, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 15/148,819

(22) Filed: May 6, 2016

(65) Prior Publication Data

US 2016/0254995 A1    Sep. 1, 2016

Related U.S. Application Data (63) Continuation of application No. PCT/CN2013/086717, filed on Nov. 7, 2013.

(51) Int. Cl.
  *H04L 12/721* (2013.01)
  *H04L 12/741* (2013.01)
  *H04L 12/24* (2006.01)
  *H04L 12/813* (2013.01)

(52) U.S. Cl.
  CPC ............ *H04L 45/54* (2013.01); *H04L 41/022* (2013.01); *H04L 45/38* (2013.01); *H04L 47/20* (2013.01)

(58) Field of Classification Search
  CPC ........ H04L 45/38; H04L 45/54; H04L 49/254
  See application file for complete search history.

(56) References Cited

U.S. PATENT DOCUMENTS

2012/0155467 A1* 6/2012 Appenzeller ........... H04L 45/54
                                                  370/392
2012/0195318 A1* 8/2012 Numata .............. H04L 41/0856
                                                  370/392

(Continued)

FOREIGN PATENT DOCUMENTS

CN          103023707 A       4/2013
CN          103152361 A       6/2013
                 (Continued)

OTHER PUBLICATIONS

"OpenFlow Switch Errata" Version 1.0.2, ONF TS-013, Nov. 1, 2013, 12 pages.

(Continued)

*Primary Examiner* — Scott M Sciacca
(74) *Attorney, Agent, or Firm* — Conley Rose, P.C.

(57) ABSTRACT

A preset flow table matching policy in a switching device is set, a flow table for processing data by a switching device that the data needs to pass through during forwarding and an action that needs to be executed in the flow table are generated according to the matching policy and capability information of the switching device, and the flow table is sent to the switching device that the data needs to pass through during forwarding such that the control device may generate, according to different flow table information of the switching device and with reference to different data forwarding policies, a corresponding flow table to be executed by the switching device, which manages switching devices of different types, and enables a switching device that has multiple flow tables to flexibly implement a data forwarding function in use of a preset policy.

16 Claims, 2 Drawing Sheets

(56) References Cited

U.S. PATENT DOCUMENTS

| | | | | |
|---|---|---|---|---|
| 2014/0241356 A1* | 8/2014 | Zhang | ............... | H04L 45/38 370/392 |
| 2015/0009830 A1* | 1/2015 | Bisht | ............... | H04L 47/125 370/236 |

FOREIGN PATENT DOCUMENTS

| | | |
|---|---|---|
| CN | 103281246 A | 9/2013 |
| WO | 2012081146 A1 | 6/2012 |
| WO | 2013093858 A1 | 6/2013 |

OTHER PUBLICATIONS

Foreign Communication From a Counterpart Application, Chinese Application No. 201380002635.9, Chinese Office Action dated May 26, 2017, 5 pages.

Foreign Communication From a Counterpart Application, Chinese Application No. 201380002635.9, Chinese Search Report dated May 5, 2017, 2 pages.

Partial English Translation and Abstract of Chinese Patent Application No. CN103023707, May 10, 2016, 7 pages.

Partial English Translation and Abstract of Chinese Patent Application No. CN103281246, May 10, 2016, 8 pages.

"OpenFlow Switch Specification," Version 1.3.2 (Wire Protocol 0x04), ONF TS-009, Apr. 25, 2013, 132 pages.

"OpenFlow Switch Specification," Version 1.1.0 Implemented (Wire Protocol 0x02) ONF TS-002, Feb. 28, 2011, 58 pages.

Foreign Communication From a Counterpart Application, European Application No. 13897089.2, Extended European Search Report dated Sep. 5, 2016, 11 pages.

Foreign Communication From a Counterpart Application, PCT Application No. PCT/CN2013/086717, English Translation of International Search Report dated Mar. 27, 2014, 2 pages.

Foreign Communication From a Counterpart Application, PCT Application No. PCT/CN2013/086717, English Translation of Written Opinion dated Mar. 27, 2014, 12 pages.

* cited by examiner

CONTROL DEVICE AND CONTROL METHOD IN SDN NETWORK

CROSS-REFERENCE TO RELATED APPLICATIONS

This application is a continuation of International Application No. PCT/CN2013/086717, filed on Nov. 7, 2013, which is hereby incorporated by reference in its entirety.

TECHNICAL FIELD

The present disclosure relates to the field of information technologies, and in particular, to a control device and a control method in a software-defined network (SDN)

BACKGROUND

An SDN is a new innovative network architecture, and a core technology OpenFlow of the SDN separates a control plane of a network device from a data plane of the network device, thereby flexibly controlling network traffic, and providing a favorable platform for innovation of a core network and an application.

OpenFlow is a new network switching model, which supports control of a user over a network processing behavior using an open flow table. A data forwarding layer is separated from a control layer in an OpenFlow network, where a switch in the OpenFlow network forwards data at a data layer, and a controller implements a function of the control layer. The controller controls an OpenFlow switch using the OpenFlow protocol, thereby controlling an entire network.

A flow table is a core data structure for controlling a forwarding policy by a switch in the OpenFlow network. A switching chip decides, by matching a flow table entry, to adopt a proper behavior for network traffic that enters the switch. Each table entry includes three fields, that is, a header field, a counters field, and an actions field.

Each table entry is corresponding to zero or multiple actions, and if there is no forwarding action, a packet is discarded by default. Multiple actions need to be executed sequentially according to an order of priorities. However, a packet is not sent according to an order.

In a protocol version later than OpenFlow 1.1, a switch adopts a multi-flow table manner.

Data processing is a processing pipeline including multiple flow tables, and a controller delivers a flow table entry to one or more tables according to a forwarding rule of a data flow. The data flow performs matching according to a match field in a flow table entry, and if multiple flow table entries can be matched, a flow table entry with a highest priority is executed, and then an action of the flow table entry is executed.

There is no definition of implementation of a multi-flow table structure in the OpenFlow protocol, and multi-flow table structures of switches from different manufacturers may be different. When there are switches from multiple manufacturers in a network managed by a controller, the controller has no unified processing rule for multiple types of flow tables, which causes that a switch cannot forward data.

SUMMARY

Embodiments of the present disclosure provide a control device and a control method in an SDN network, to implement that a multi-flow table switch can efficiently forward data.

An embodiment of the present disclosure provides a control device in an SDN network, where the SDN network includes at least one switching device, and the control device includes a flow table capability acquiring unit configured to acquire flow table capability information of the switching device, a flow table generating unit configured to perform, according to the flow table capability information and a preset flow table matching policy, policy matching on a switching device that data needs to pass through during forwarding, generate a flow table for forwarding the data by the switching device that the data needs to pass through during forwarding, and allocate an action that needs to be executed in the flow table, and a flow table sending unit configured to send the flow table generated by the flow table generating unit to the switching device that the data needs to pass through during forwarding.

Optionally, the flow table generating unit includes a policy setting unit, a policy matching unit, and an action allocating unit, where the policy setting unit is configured to set at least one matching policy, where the matching policy is used to match capability information of the switching device to acquire the flow table for forwarding the data by the switching device. The policy matching unit is configured to perform, according to the flow table capability information acquired by the flow table capability acquiring unit, policy matching on the switching device that the data needs to pass through during forwarding, and generate the flow table for forwarding the data by the switching device that the data needs to pass through during forwarding. The action allocating unit is configured to allocate, according to the policy set by the policy setting unit, an action that needs to be executed to the flow table generated by the policy matching unit.

Optionally, the policy set by the policy setting unit includes a first matching policy, where the policy requires that all requirements of data forwarding be met, and requires that all actions required during data forwarding be executed, a second matching policy, where the policy does not require that all requirements of data forwarding be met, and requires that an action supported by a switching device be executed, and a third matching policy, where the policy requires that a lowest requirement of data forwarding be met, and requires that an action that needs to be executed during data forwarding be executed.

Optionally, the policy matching unit performs matching on the flow table of the switching device according to a preset principle and according to the flow table capability information acquired by the flow table capability acquiring unit and the policy set by the policy setting unit, to acquire the flow table for forwarding the data by the switching device that the data needs to pass through during forwarding, where the switching device includes at least one flow table, and the preset principle includes at least one of the following principles: preferably selecting a table whose match field is completely included in a required match field, selecting an exact match table prior to a wildcard match table, selecting a table with a smallest quantity of match fields when a field that is not included in a matching requirement exists in an exact match table, and selecting a table with a smallest table identifier (ID).

Optionally, the action allocating unit allocates, according to an order of a table ID of a flow table obtained by matching by the policy matching unit, an action that needs to be completed.

Optionally, the flow table sending unit sends the flow table obtained after matching to the switching device using a FlowMod message.

Optionally, the policy matching unit performs matching on the flow table of the switching device according to the acquired flow table capability information and according to an order from the first matching policy to the third matching policy.

Optionally, the policy matching unit is further configured to set priorities for delivered flow tables according to quantities of flow table entries.

Optionally, after obtaining, by matching according to a capability information of the switching device, the flow table for forwarding the data by the switching device that the data needs to pass through during forwarding, the policy matching unit makes the following adjustment to a flow table that includes matched inport. If a DstMac field exists in an inport table of the switching device, inport tables of all other matching policies except a matching policy for layer 2 forwarding match DstMac to distinguish between services, where a jump may be performed randomly between tables, or if no DstMac exists in an inport table of the switching device, and the inport table is a wildcard match table, inport tables of all matching policies need to match a same field, and a smaller table ID of a flow table entry goto indicates a higher set priority, or if no DstMac exists in an inport table, and the inport table is an exact match table, in an action of a flow table entry of the inport table, goto table can jump only to a next table.

Optionally, the control device further includes a driver generating unit configured to generate different unified policies according to switching devices of different types, where the unified policy is applicable to all switching devices of a same type, and generate, according to the unified policies, flow tables corresponding to the switching devices.

An embodiment of the present disclosure further provides a control method in an SDN network, where the SDN network includes at least one switching device, and the method includes acquiring flow table capability information of the switching device, performing, according to the flow table capability information and a preset flow table matching policy, policy matching on a switching device that data needs to pass through during forwarding, generating a flow table for forwarding the data by the switching device that the data needs to pass through during forwarding, and allocating an action that needs to be executed in the flow table, and sending the generated flow table to the switching device that the data needs to pass through during forwarding.

Optionally, before performing policy matching on a switching device that data needs to pass through during forwarding, the method further includes setting at least one matching policy, where the matching policy is used to match capability information of the switching device to acquire the flow table for forwarding the data by the switching device, and after generating a flow table for forwarding the data by the switching device that the data needs to pass through during forwarding, the method further includes allocating, according to the matching policy used to generate the flow table, an action that needs to be executed to the flow table obtained by matching.

Optionally, the set policy includes a first matching policy, where the policy requires that all requirements of data forwarding be met, and requires that all actions required during data forwarding be executed, a second matching policy, where the policy does not require that all requirements of data forwarding be met, and requires that an action supported by a switching device be executed, and a third matching policy, where the policy requires that a lowest requirement of data forwarding be met, and requires that an action that needs to be executed during data forwarding be executed.

Optionally, generating a flow table for forwarding the data by the switching device that the data needs to pass through during forwarding includes generating, according to a preset principle and according to the flow table capability information and the matching policy, the flow table for forwarding the data by the switching device that the data needs to pass through during forwarding, where the switching device includes at least one flow table, and the preset principle includes at least one of the following principles. Preferably selecting a table whose match field is completely included in a required match field, selecting an exact match table prior to a wildcard match table, selecting a table with a smallest quantity of match fields when a field that is not included in a matching requirement exists in an exact match table, and selecting a table with a smallest table ID.

Optionally, allocating an action that needs to be executed in the flow table includes allocating, according to an order of a table ID of the generated flow table, an action that needs to be completed.

Optionally, sending the generated flow table to the switching device that the data needs to pass through during forwarding includes sending, using a FlowMod message, the generated flow table to the switching device that the data needs to pass through during forwarding.

Optionally, the performing policy matching on a switching device that data needs to pass through during forwarding includes performing matching on the flow table of the switching device according to the acquired flow table capability information and according to an order from the first matching policy to the third matching policy.

Optionally, the method further includes setting priorities for delivered flow tables according to quantities of flow table entries.

Optionally, the method further includes after the flow table for forwarding the data by the switching device that the data needs to pass through during forwarding is obtained by matching according to a capability of the switching device, making the following adjustment to a flow table that includes matched inport: if a DstMac field exists in an inport table of the switching device, inport tables of all other matching policies except a matching policy for layer 2 forwarding match DstMac to distinguish between services, where a jump may be performed randomly between tables, or if no DstMac exists in an inport table of the switching device, and the inport table is a wildcard match table, inport tables of all matching policies need to match a same field, and a smaller table ID of a flow table entry goto indicates a higher set priority, or if no DstMac exists in an inport table, and the inport table is an exact match table, in an action of a flow table entry of the inport table, goto table can jump only to a next table.

Optionally, the method further includes generating different unified policies according to switching devices of different types, where the unified policy is applicable to all switching devices of a same type, and generating, according to the unified policies, flow tables corresponding to the switching devices.

According to the control device and the control method in an SDN network provided in the embodiments of the present disclosure, a preset flow table matching policy in a switching device is set, a flow table for processing data by a switching device that the data needs to pass through during forwarding and an action that needs to be executed in the flow table are generated according to the matching policy and capability information of the switching device, and sends to the switching device that the data needs to pass through during forwarding such that the control device can generate, according to different flow table information of a switching device and with reference to different data forwarding policies, a corresponding flow table to be executed by the switching device, which manages switching devices of different types, and enables a switching device that has multiple flow tables to flexibly implement a data forwarding function in use of a preset policy, thereby reducing management complexity for the switching device, and giving full play to performance of the switching device.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
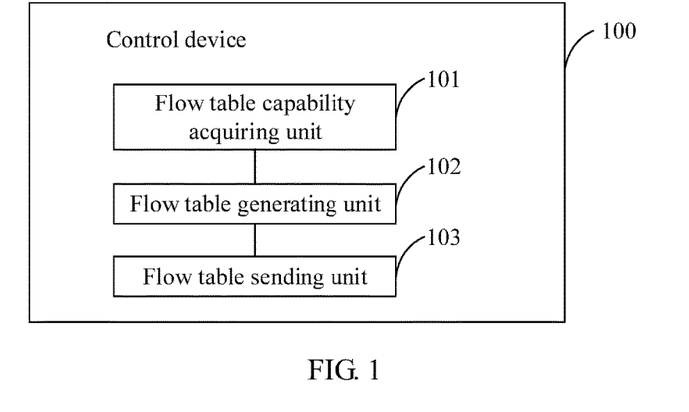
FIG. 1 is a schematic structural diagram of a control device in an SDN network according to an embodiment of the present disclosure.

Referring to FIG. 1, FIG. 1 is a schematic structural diagram of a control device 100 in an SDN network according to an embodiment of the present disclosure, where the SDN network includes at least one switching device, and the control device 100 in the SDN network includes a flow table capability acquiring unit 101 configured to acquire flow table capability information of the switching device, a flow table generating unit 102 configured to perform, according to the flow table capability information and a preset flow table matching policy, policy matching on a switching device that data needs to pass through during forwarding, generate a flow table for forwarding the data by the switching device that the data needs to pass through during forwarding, and allocate an action that needs to be executed in the flow table, and a flow table sending unit 103 configured to send the flow table generated by the flow table generating unit 102 to the switching device that the data needs to pass through during forwarding.

According to the foregoing control device in this embodiment of the present disclosure, a preset flow table matching policy in a switching device is set, a flow table for processing data by a switching device that the data needs to pass through during forwarding and an action that needs to be executed in the flow table are generated according to the matching policy and capability information of the switching device, and the flow table is sent to the switching device that the data needs to pass through during forwarding such that the control device can generate, according to different flow table information of a switching device and with reference to different data forwarding policies, a corresponding flow table to be executed by the switching device, which manages switching devices of different types, and enables a switching device that has multiple flow tables to flexibly implement a data forwarding function in use of a preset policy, thereby reducing management complexity for the switching device, and giving full play to performance of the switching device.

Figure 2:
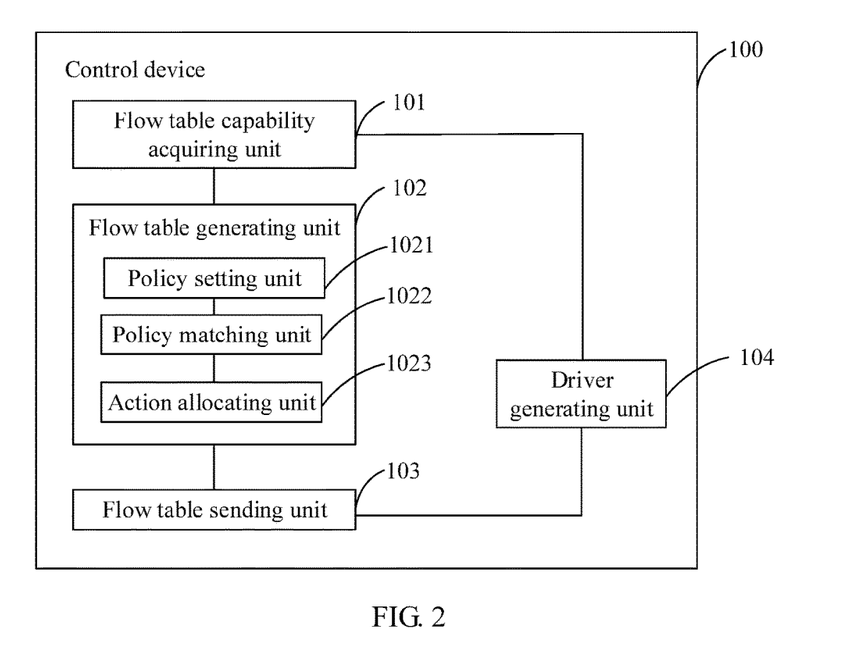
FIG. 2 is a schematic structural diagram of another control device in an SDN network according to an embodiment of the present disclosure.

In an optional implementation manner, as shown in FIG. 2, the flow table generating unit 102 includes a policy setting unit 1021, a policy matching unit 1022, and an action allocating unit 1023, where the policy setting unit 1021 is configured to set at least one matching policy, where the matching policy is used to match capability information of the switching device to acquire the flow table for forwarding the data by the switching device. The policy matching unit 1022 is configured to perform, according to the flow table capability information acquired by the flow table capability acquiring unit 101, policy matching on the switching device that the data needs to pass through during forwarding, and generate the flow table for forwarding the data by the switching device that the data needs to pass through during forwarding, and the action allocating unit 1023 is configured to allocate, according to the policy set by the policy setting unit 1021, an action that needs to be executed to a flow table obtained by matching by the policy matching unit 1022.

In an optional implementation manner, the policy set by the policy setting unit 1021 may include a first matching policy, where the policy requires that all requirements of data forwarding be met, and requires that all actions required during data forwarding be executed, a second matching policy, where the policy does not require that all requirements of data forwarding be met, and requires that an action supported by a switching device be executed, and a third matching policy, where the policy requires that a lowest requirement of data forwarding be met, and requires that an action that needs to be executed during data forwarding be executed.

In an optional implementation manner, the policy matching unit 1022 performs matching on the flow table of the switching device according to the acquired flow table capability information and according to an order from the first matching policy to the third matching policy.

Correspondingly, the policy matching unit 1022 performs matching on the flow table of the switching device according to the flow table capability information acquired by the flow table capability acquiring unit 101 and the policy set by the policy setting unit 1021, to acquire the flow table for forwarding the data by the switching device that the data needs to pass through during forwarding, where the switching device includes at least one flow table.

The preset principle includes at least one of the following principles: preferably selecting a table whose match field is completely included in a required match field, selecting an exact match table prior to a wildcard match table, selecting a table with a smallest quantity of match fields when a field that is not included in a matching requirement exists in an exact match table, and selecting a table with a smallest table ID.

A capacity of a flow table entry of an exact match table is much greater than that of a wildcard match table, and consumes fewer storage resources of a switch. Therefore, by selecting an exact match table prior to a wildcard match table, a system resource can be saved.

The foregoing policy setting unit 1021 sets a policy, and a policy matching unit 1022 obtains a flow table after performing matching according to a preset principle, which can match and deliver flow tables of multiple types of different switches such that a controller can be compatible with switches of different types, control switching devices of different types, and generate and deliver a flow table. In addition, for a multi-flow table switching device, a flow table that meets a highest forwarding requirement can be preferably selected such that when forwarding data, the multi-flow table switching device gives full play to a forwarding capability of the multi-flow table switching device, thereby implementing maximized resource utilization of the switching device, and giving full play to performance of the switching device.

In an optional implementation manner, the action allocating unit 1023 may allocate, according to an order of a table ID, such as a size order of the table ID, of the flow table obtained by matching by the policy matching unit 1022, an action that needs to be completed.

For example, first, a table with a largest table ID is selected, an action that needs to be completed in a matching policy and is supported by the table is selected, and the action is filled in an actions field in the table. Then, a next table with a largest table ID is selected, and a remaining action that needs to be completed is filled in an actions field in the next table until all actions are completely selected, or no table is left.

In an optional implementation manner, the flow table sending unit 103 sends the flow table obtained after matching to the switching device using a FlowMod message.

Using the foregoing three different matching policies to perform matching, if a switching device has multiple flow tables, a control device selects an optimal flow table to forward data, and a capability of the switching device is maximized.

When a conflict occurs between flow tables delivered by the control device 100, the policy matching unit 1022 is further configured to set priorities for the delivered flow tables according to quantities of flow table entries.

Alternatively, when a conflict occurs between flow tables delivered by the control device 100, after obtaining, by matching according to a capability of the switching device, the flow table for forwarding the data by the switching device that the data needs to pass through during forwarding, the policy matching unit 1022 may further make the following adjustment to a flow table that includes matched inport.

If a DstMac field exists in an inport table of the switching device, inport tables of all other matching policies except a matching policy for layer 2 forwarding match DstMac to distinguish between services, where a jump may be performed randomly between tables, or if no DstMac exists in an inport table of the switching device, and the inport table is a wildcard match table, inport tables of all matching policies need to match a same field, and a smaller table ID of a flow table entry goto indicates a higher set priority, or if no DstMac exists in an inport table, and the inport table is an exact match table, in an action of a flow table entry of the inport table, goto table can jump only to a next table.

In the foregoing manner, a problem of a flow table conflict that occurs when a control device delivers flow tables can be resolved, and accuracy of applicability of the flow tables when the control device delivers the flow tables are further improved, thereby avoiding problems such as service interruption that is of a data forwarding service and is brought by the flow table conflict, and improving overall performance of the control device and a switching device in an SDN network during a data forwarding process.

Optionally, switching devices of a same type may deliver flow tables together according to a unified policy. As shown in FIG. 2, the control device 100 further includes a driver generating unit 104 configured to generate different unified policies according to switching devices of different types, where the unified policy is applicable to all switching devices of a same type, and generate, according to the unified policies, flow tables corresponding to the switching devices.

By applying a unified policy to switching devices of a unified type, a speed of matching a flow table is increased during a data forwarding process, data forwarding efficiency is improved, and overall performance of a control device and the switching devices is further improved.

Figure 3:
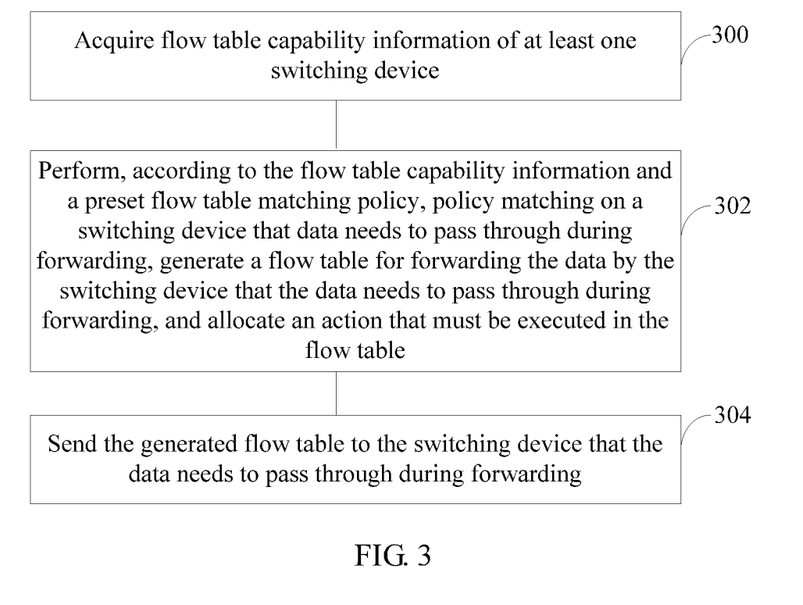
FIG. 3 is a schematic flowchart of a control method in an SDN network according to an embodiment of the present disclosure.

Referring to FIG. 3, FIG. 3 is a schematic flowchart of a control method in an SDN network according to an embodiment of the present disclosure, where the SDN network includes at least one switching device, and the method includes the following steps.

Step 300: Acquire flow table capability information of the at least one switching device.

Step 302: Perform, according to the flow table capability information and a preset flow table matching policy, policy matching on a switching device that data needs to pass through during forwarding, generate a flow table for forwarding the data by the switching device that the data needs to pass through during forwarding, and allocate an action that needs to be executed in the flow table.

Step 304: Send the generated flow table to the switching device that the data needs to pass through during forwarding.

Using the foregoing method, a flow table for processing data by a switching device that the data needs to pass through during forwarding and an action that needs to be executed in the flow table are generated according to a preset flow table matching policy and capability information of the switching device, and sent to the switching device that the data needs to pass through during forwarding, which manages switching devices of different types, and enables a switching device that has multiple flow tables to flexibly forwarding data using a preset policy, thereby reducing management complexity for the switching device, and giving full play to performance of the switching device.

The foregoing method may be completed by a control device in an SDN network, and by executing the foregoing steps, the control device can generate, according to different flow table information of a switching device and with reference to different data forwarding policies, a corresponding flow table to be executed by the switching device, which flexibly delivers a flow table, improves data forwarding flexibility, and increases a device utilization rate.

In an optional implementation manner, before policy matching is performed on the switching device that the data needs to pass through during forwarding, the method further includes setting at least one matching policy, where the matching policy is used to match capability information of the switching device to acquire the flow table for forwarding the data by the switching device.

After generating a flow table for forwarding the data by the switching device that the data needs to pass through during forwarding, the method further includes allocating, according to the matching policy used to generate the flow table, an action that needs to be executed to the flow table obtained by matching.

The set policy includes a first matching policy, where the policy requires that all requirements of data forwarding be met, and requires that all actions required during data forwarding be executed, a second matching policy, where the policy does not require that all requirements of data forwarding be met, and requires that an action supported by a switching device be executed, and a third matching policy, where the policy requires that a lowest requirement of data forwarding be met, and requires that an action that needs to be executed during data forwarding be executed.

When policy matching is being performed on the switching device that the data needs to pass through during forwarding, matching may be performed on the flow table of the switching device according to the acquired flow table capability information and according to an order from the first matching policy to the third matching policy.

Using the foregoing three different matching policies to perform matching, in a case in which a switching device has multiple flow tables, a control device selects an optimal flow table to forward data, and a capability of the switching device is maximized.

In an optional implementation manner, when the flow table for forwarding the data by the switching device that the data needs to pass through during forwarding is being generated, the flow table for forwarding the data by the switching device that the data needs to pass through during forwarding may be generated according to a preset principle and according to the flow table capability information acquired by a flow table capability acquiring unit and the policy set by a policy setting unit, where the switching device includes at least one flow table.

The preset principle includes at least one of the following principles: preferably selecting a table whose match field is completely included in a required match field, selecting an exact match table prior to a wildcard match table, selecting a table with a smallest quantity of match fields when a field that is not included in a matching requirement exists in an exact match table, and selecting a table with a smallest table ID.

Using the foregoing principle, a flow table that maximizes data forwarding can be obtained by matching such that performance of a switching device can be maximized during data forwarding, and a device utilization rate is increased.

Optionally, when the action that needs to be executed in the flow table is being allocated, an action that needs to be completed may be allocated according to an order of a table ID of the generated flow table.

When the generated flow table is being sent to the switching device that the data needs to pass through during forwarding, the generated flow table may be sent, using a FlowMod message, to the switching device that the data needs to pass through during forwarding.

Due to a limitation of a parameter in a generated flow table, during an implementation process, a conflict between flow tables generated using the foregoing method may occur. The conflict between the flow tables may be resolved in the following manner.

Priorities are set for delivered flow tables according to quantities of flow table entries, or after the flow table for forwarding the data by the switching device that the data needs to pass through during forwarding is obtained by matching according to a capability of the switching device, the following adjustment is made to a flow table that includes matched inport.

If a DstMac field exists in an inport table of the switching device, inport tables of all other matching policies except a matching policy for layer 2 forwarding match DstMac to distinguish between services, where a jump may be performed randomly between tables, or if no DstMac exists in an inport table of the switching device, and the inport table is a wildcard match table, inport tables of all matching policies need to match a same field, and a smaller table ID of a flow table entry goto indicates a higher set priority, or if no DstMac exists in an inport table, and the inport table is an exact match table, in an action of a flow table entry of the inport table, goto table can jump only to a next table.

The control method in this embodiment of the present disclosure may further include generating different unified policies according to switching devices of different types, where the unified policy is applicable to all switching devices of a same type, and generating, according to the unified policies, flow tables corresponding to the switching devices.

By applying a unified policy to switching devices of a unified type, a speed of matching a flow table is increased during a data forwarding process, data forwarding efficiency is improved, and overall performance of a control device and the switching devices is further improved.

The following gives, in a specific implementation manner, a detailed introduction to an implementation manner of a control device provided in embodiments of the present disclosure. The control device in the embodiments of the present disclosure may be a controller that supports the OpenFlow protocol, and a switching device in the embodiments of the present disclosure may be a switch that supports the OpenFlow protocol. According to the OpenFlow protocol, the controller interacts with the switch to acquire flow table capability information of the switch.

The flow table capability acquiring unit may acquire the flow table capability information of the switch using a message specified in the OpenFlow protocol.

The flow table capability information includes capability information of each flow table among multiple flow tables of the switch. Capability information of a flow table includes a match field supported by the table, match fields that support wildcard matching, which may be, for example, Inport, EtherType, SrcMac, DstMac, and SrcIPv4/6, an action supported by the table, which may be, for example, OutPut, SetField, Push vlan, Pop vlan, or Group, and an instruction supported by the table such as writeAction, gotoTable, writeMetada, or clearActions.

Capabilities of switches are different. Therefore, the controller needs to set matching policies required by different capabilities such that a switch with a high capability can give full play to performance of the switch, to meet a service forwarding requirement.

The controller sets three matching policies: a first matching policy, a second matching policy, and a third matching policy. The three matching policies each set a requirement of data forwarding according to an order of meeting a data forwarding requirement. For the first matching policy, the first matching policy requires that all requirements of data forwarding be met, and requires that all required actions be executed. For the second matching policy, the second matching policy requires that data forwarding be met, does not require that all requirements of data forwarding be met, and requires that an action supported by a switch be executed. For the third matching policy, the third matching policy requires that a lowest requirement of data forwarding be met, and that an action that needs to be executed during data forwarding be executed.

A policy matching unit in the controller performs matching on each flow table according to acquired capability information of multiple flow tables and according to an order from the first matching policy to the third matching policy. For example, first, matching is performed on multiple flow tables according to the first matching policy, and if a flow table meets a requirement of the first matching policy, it indicates that the switch can meet a highest requirement of data forwarding, and no more matching is performed. If none of flow tables of a switch meets a requirement of the first matching policy, matching is performed according to the second matching policy. If a flow table meets a requirement of the second matching policy, it indicates that the switch can meet the requirement of data forwarding, and no more matching is performed. If none of flow tables of a switch meets a requirement of the second matching policy, matching is performed according to the third matching policy to determine a flow table that meets the lowest requirement of forwarding. If no flow table meets the third matching policy, the switch cannot meet the requirement of data forwarding.

Layer 3 forwarding (communication between two hosts on different network segments, where destination media access control (MAC) in a data packet sent by a source host is MAC of a gateway instead of MAC of a destination host. Therefore, it is determined that a data flow needs to match a destination Internet Protocol (IP) address) is used as an example, and classification of matching policies for layer 3 forwarding is as follows.

First, there are four types of switches at different locations according to different locations in a forwarding path: a layer 3 source port switch (L3SrcSwitch), a layer 3 middle switch (L3MidSwitch), a layer 3 destination port switch (L3DstSwitch), and a layer 3 local traffic switch (L3LocalSwitch). Matching is performed on a switch at each location separately according to the first matching policy, the second matching policy, and the third matching policy. In a match field, the third matching policy is used only for forwarding. A layer 3 data packet is forwarded according to destination IP (DstIP). It is specified in the protocol that a DstIP match field depends on EtherType, and therefore, EtherType+DstIP are match fields required by the third matching policy. The first matching policy includes all data packets that need matching, and further includes matching the MAC of the gateway using a DstMac match field, matching location information of the source host using an Inport match field, and matching source IP using a source IP match field to confirm identity information of the source host. The second matching policy is between the first matching policy and the third matching policy, and may not match DstMac or Inport. For an action part of a flow table entry, the third matching policy needs to include only output for forwarding, and a destination port switch further needs to modify SrcMac and DstMac. The first matching policy requires that a switch support a Fast Failover function of Group, to support multi-path load balancing, and a vlan tag can be added. The second matching policy may not support Fast Failover of Group. A finally defined matching policy is as follows (the layer 3 source port switch, the layer 3 destination port switch, and the layer 3 local traffic switch are used as examples for description).

| Layer 3 source port switch (L3SrcSwitch) | Match fields | Actions |
| --- | --- | --- |
| First matching policy | EtherType, Inport, DstMac, SrcIP, and DstIP | Push vlan, Group (FastFailover), and output |
| Second matching policy | EtherType, Inport, SrcIP, and DstIP | Push vlan and output |
| Third matching policy | EtherType and DstIP | Output |

| Layer 3 destination port switch (L3DstSwitch) | Match fields | Actions |
| --- | --- | --- |
| First matching policy | EtherType, DstMac, SrcIP, and DstIP | Modify SrcMac, modify DstMac, modify VlanId or pop vlan, and output |
| Second matching policy | EtherType, SrcIP, and DstIP | Modify SrcMac, modify DstMac, and output |
| Third matching policy | EtherType and DstIP | Modify SrcMac, modify DstMac, and output |

| Layer 3 local traffic switch (L3LocalSwitch) | Match fields (Match fields) | Actions (Actions) |
| --- | --- | --- |
| First matching policy | EtherType, Inport, DstMac, SrcIP, and DstIP | Modify SrcMac, modify DstMac, modify VlanId, and output |
| Second matching policy | EtherType, SrcIP, and DstIP | Modify SrcMac, modify DstMac, and output |
| Third matching policy | EtherType and DstIP | Modify SrcMac, modify DstMac, and output |

Layer 2 forwarding (communication between two hosts on a same network segment) is used as an example. Destination MAC in a data packet sent by a source host is MAC of a destination host. The third matching policy needs to match only a destination MAC address and support output for forwarding. In the first matching policy, an Inport match field is added to determine location information of the source host, an SrcMac match field is used to determine identity information of the source host, and an EtherType match field is used to determine type information of a layer 2 data packet. An action is required to support FastFailover of Group to support multi-path load balancing and adding of a Vlan tag. The second matching policy is between the first matching policy and the third matching policy, does not match EtherType, and does not require Fast Failover of Group. Classification of defined matching policies is as follows (a layer 2 source port switch, a layer 2 middle switch, a layer 2 destination port switch, and a layer 2 local traffic switch are used as examples for description).

| Layer 2 source port switch (L2SrcSwitch) | Match fields | Actions |
| --- | --- | --- |
| First matching policy | EtherType, Inport, SrcMac, and DstMac | Push vlan, Group (FastFailover), and output |
| Second matching policy | Inport, SrcMac, and DstMac | Push vlan and output |
| Third matching policy | DstMac | Output |

| Layer 2 middle switch (L2MidSwitch) | Match fields | Actions |
| --- | --- | --- |
| First matching policy | Ethertype, SrcMac, and DstMac | Group (FastFailover) and output |
| Second matching policy | SrcMac and DstMac | Output |
| Third matching policy | DstMac | Output |

| Layer 2 destination port switch (L2DstSwitch) | Match fields (Match fields) | Actions (Actions) |
| --- | --- | --- |
| First matching policy | Ethertype, SrcMac, and DstMac | Pop vlan and output |
| Second matching policy | SrcMac and DstMac | Output |
| Third matching policy | DstMac | Output |

| Layer 2 local traffic switch (L2LocalSwitch) | Match fields | Actions |
| --- | --- | --- |
| First matching policy | EtherType, Inport, SrcMac, and DstMac | Output |
| Second matching policy | SrcMac and DstMac | Output |
| Third matching policy | DstMac | Output |

After foregoing matching policies are completely set, the controller performs matching on the multi-flow table switch according to the acquired flow table capability information of the switch and according to a preset principle. A matching process may be a cyclic process. A most proper table is selected each time until match fields of all matching requirements are matched and used by a flow table. For example, matching may be performed using the following principles:

1. If a match field of a table is completely included in a required match field, it indicates that the table is exclusively designed for the requirement. Therefore, the table is preferably selected for use.

2. An exact match table is selected prior to a wildcard match table, because a capacity of a flow table entry of an exact match table is much greater than that of a wildcard match table, and a flow table entry of an exact match table consumes fewer storage resources of a switch.

3. When a field that is not included in a matching requirement exists in an exact match table, a table with a smallest quantity of match fields is selected, and because the table is an exact match table and does not include matching field that is included in the matching requirement, when the controller delivers a flow table entry, it is also required to fill a value in this match field.

4. A table with a smallest table ID is selected, because a smaller table ID indicates earlier matching in a pipeline.

For example, an access control list (ACL) defined by the controller needs to match the following match fields:
EtherType+SrcIP+DstIP+IP+SrcPort+DstPort.

In addition, a multi-flow table structure of a switch is as follows:

Table 0: EthType, SrcIP, DstIP, SrcMac, and DstMac wildcard match table quantity of match fields included=3

Table 1: IP, SrcPort, and DstPort exact match table completely included in a matching policy Table 2: EthType, SrcIP, DstIP, and Inport exact match table quantity of match fields included=3

Table 3: EthType+SrcIP+DstIP, MPLS label, and MPLS TC exact match table quantity of match fields included=3

A process during which the controller performs matching on a flow table may be as follows.

Match fields of Table 1 are completely included in the match fields required by the ACL, and a situation in principle 1 for selecting a table is met. Therefore, a result of the first time of circulation is selecting Table 1. EtherType+SrcIP+DstIP are left for the second time of cyclic matching. Each of Table 0, Table 2, and Table 3 includes the three match fields. Therefore, Table 0 is excluded according to the principle of preferably selecting an exact match table. A quantity of match fields included in Table 2 is less than a quantity of match fields included in Table 3. Therefore, Table 2 is selected. Finally, flow tables obtained after matching by the policy matching unit 1022 in the controller are shown in Table 1.

TABLE 1

| Table ID | Exactly matched | Match field that is matched | Match field that is added | Action that needs to be completed |
| --- | --- | --- | --- | --- |
| 1 | Yes | IP, SrcPort, and DstPort | | |
| 2 | Yes | EthType, SrcIP, and DstIP | Inport | |

It should be noted that, an exact match table is selected in the foregoing. However, a match field that is not included in a matching policy exists in the table, and the table is an exact match table. Therefore, a value needs to be given to the match field, and is filled in the fourth column (match field that is added). When a flow table entry is being delivered, a value also needs to be given to the field.

After the policy matching unit in the controller obtains, by matching, a flow table that meets a requirement, there is a need to determine an action that needs to be completed in each table. A policy setting unit has set actions that need to be completed by switches. However, actions supported by different switches are different, and actions supported by tables are also different. Therefore, there is a need to allocate, according to capabilities of tables of the switches, the actions set by the policy setting unit to all tables for execution.

An action allocating unit may allocate, in the following manner, an action to the flow table obtained after matching:

1. A table with a largest table ID is selected, an action that needs to be completed in a matching policy and is supported by the table is selected, and the action is filled in an actions field in the table.

2. A next table with a largest table ID is selected, and a remaining action that needs to be completed is filled, by performing the operation in step 1, in an actions field in the table until all actions are completely selected, or no table is left.

When the controller receives, from a switch, a request message for requesting a forwarding policy, a flow table sending unit generates a FlowMod message to deliver a flow table entry, where the FlowMod message may include the following information. A table ID, a list of field values that need to be matched, an action that needs to be executed, a value to be written to metadata, a table to which a jump is performed, a priority of a flow table entry, an aging time, and the like. In an optional implementation manner, the flow table sending unit 103 generates one FlowMod message for each flow table obtained after matching. To avoid data truncation between flow tables, an order of flow tables may be ensured by transferring metadata. A former table writes a value that matches the table into the metadata. A latter table matches the metadata into which is written by the former table, and a jump is directly performed between the former table and the latter table using goto table. When flow tables are being delivered, FlowMod messages are sequentially delivered in descending order of table IDs.

A flow table entry conflict is prone to occur between flow table entries automatically delivered by the controller, that is, one data flow can match at least two flow table entries. Flow table conflicts of multiple flow tables mainly occur in inport tables because there may be multiple types of data flows on a same port, and different data flows are processed in different flow tables. Therefore, when the controller delivers flow table entries, there is a need to avoid a flow table entry conflict.

When a flow table entry conflict occurs due to a difference between quantities of match fields, the policy matching unit sets, when delivering a flow table entry to a matching policy that needs to match an Inport field, different priorities for flow table entries of inport tables. The priorities are set according to quantities of match fields of flow table entries. More match fields indicate that the flow table entry is matched more precisely. Therefore, a priority set for the flow table entry is higher.

When a flow table entry conflict occurs because different data flows are not distinguished from each other in inport tables, the policy matching unit needs to make an adjustment to a flow table to overcome the flow table entry conflict.

For example, first, a flow table entry at layer 2: Inport=2, goto table 2 is delivered, and then, a flow table entry at layer 3: Inport=2, goto table 5 is delivered.

Because only Inport=2 is to be matched, both of the two flow table entries can be matched by a data flow of Inport=2, which causes a conflict between the two flow table entries. When the switch receives conflicting flow table entries, if the controller does not set an OFPFF_CHECK_OVERLAP flag in FlowMod, the switch uses a flow table entry delivered later to overwrite a previous flow table entry. Therefore, the layer 2 flow table entry is overwritten with the layer 3 flow table entry. After a layer 2 data stream matches the layer 3 flow table entry, a jump is performed to table 5. Therefore, matching between the layer 2 data flow and the flow table entry fails.

Therefore, after obtaining a flow table by matching according to a capability of a switch, the policy matching unit re-adjusts a policy that matches an inport table. The following manner may be used as a specific adjustment method:

1. If a DstMac field exists in an inport table of the switch, inport tables of all other matching policies except a matching policy for layer 2 forwarding match DstMac to distinguish between services, where a jump may be performed randomly between tables.

A method for distinguishing between services using DstMac is as follows.

If DstMac=MAC of a gateway, and that is layer 3, goto layer 3 table.

If a last bit of the first byte of DstMac is 1, and that is multicast, goto multicast table.

If DstMac=FF:FF:FF:FF:FF:FF, and then is broadcast, goto broadcast table.

2. If no DstMac exists in an inport table of the switch, and the inport table is a wildcard match table, inport tables of all matching policies need to match a same field, and a smaller table ID of a flow table entry goto indicates a higher set priority.

No DstMac exists in the inport table. Therefore, service types cannot be distinguished from each other, and truncation of goto table occurs. If the inport table matches different match fields, different metadata may also be written, and no more matching is performed when a subsequent table is to match the metadata.

3. If no DstMac exists in an inport table, and the inport table is an exact match table, in an action of a flow table entry of the inport table, goto table can jump only to a next table.

A value is given to each field of an exact match table. Therefore, in a flow table of the switch, it is impossible that two flow table entries match one data flow. However, when the controller delivers flow table entries, two flow table entries have same match fields but different actions. For example, layer 2 forwarding jumps to a layer 2 table. Layer 3 forwarding jumps to a layer 3 table. The switch determines, according to match fields, whether flow table entries are the same, and if the flow table entries are the same, a previous flow table entry is overwritten. In this case, to avoid incorrect processing caused by a difference between actions of the flow table entries, there is a need to ensure that for different matching policies, actions in an inport table are the same such that no matter which table is a table being actually processed, in the actions of the flow table entries of the inport table, goto table can jump only to a next table.

Switches of a same flow table structure, for example, switches from a same manufacturer, may generate flow tables in a unified manner and according to a preset policy.

The control device further includes a driver generating unit. The driver generating unit is configured to generate different unified policies for switches of different types, where the unified policies can be applicable to all switches of a same type, and generate, according to the unified policies, flow tables corresponding to the switches. The driver generating unit is connected to the flow table capability acquiring unit, and generates, for all switches of a same type according to the flow table capability information acquired by the flow table capability acquiring unit and a unified matching policy, flow tables corresponding to the switches. A flow table sending unit sends the flow tables to corresponding switches.

Whether switches are of a same type may be determined using information such as manufacturer descriptions, a hardware version, a software version, and a serial number. For example, the controller may send an ofpst_desc_request message to a switch, and the switch returns an ofp_desc_stats message that includes information such as manufacturer descriptions, a hardware version, a software version, and a serial number. The controller determines, according to the manufacturer, the software, and the serial number, whether switches are of a same type, and if the switches are of a same type, a same set of flow table entry policies may be shared.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control device in a software-defined network (SDN), the SDN comprising a switching device, and the control device comprising:
a memory comprising instructions; and
a processor coupled to the memory, the instructions causing the processor to be configured to:
acquire flow table capability information of the switching device;
set a matching policy comprising:
a first matching policy requiring that all requirements of data forwarding be met and requiring that all actions required during the data forwarding be executed;
a second matching policy not requiring that all requirements of the data forwarding be met and requiring that one of the actions supported by the switching device be executed; and
a third matching policy requiring that a lowest requirement of the data forwarding be met and requiring that one of the actions that needs to be executed during the data forwarding be executed;
perform, according to the flow table capability information and the matching policy, policy matching on the switching device that data needs to pass through during forwarding;
generate a flow table for forwarding the data by the switching device that the data needs to pass through during forwarding;
allocate an action that needs to be executed in the flow table; and
send the flow table to the switching device that the data needs to pass through during forwarding.

2. The control device in the SDN of claim 1, wherein the processor is further configured to:
perform matching on the flow table of the switching device according to a preset principle and according to the flow table capability information and the matching policy;
acquire the flow table for forwarding the data by the switching device that the data needs to pass through during forwarding, the switching device comprising at least one flow table, and the preset principle comprising at least one of the following principles:
selecting a table whose match field is completely comprised in a required match field;
selecting an exact match table prior to a wildcard match table;
selecting another table with a smallest quantity of match fields when a field that is not comprised in a matching requirement exists in the exact match table; or
selecting another table with a smallest table identifier (ID).

3. The control device in the SDN of claim 1, wherein the processor is further configured to allocate the action that needs to be completed according to an order of a table identifier (ID) of the flow table.

4. The control device in the SDN of claim 1, wherein the processor is further configured to send the flow table obtained after matching to the switching device using a FlowMod message.

5. The control device in the SDN of claim 1, wherein the processor is further configured to perform matching on the flow table of the switching device according to the flow table capability information and according to an order from the first matching policy to the third matching policy.

6. The control device in the SDN of claim 1, wherein the processor is further configured to set priorities for delivered flow tables according to quantities of flow table entries.

7. The control device in the SDN of claim 1, wherein the processor is further configured to:

generate different unified policies according to switching devices of different types, the unified policies being applicable to all switching devices of a same type; and generate, according to the unified policies, flow tables corresponding to the switching devices.

8. A control device in a software-defined network (SDN), the SDN comprising a switching device, and the control device comprising:

a memory comprising instructions; and a processor coupled to the memory, the instructions causing the processor to be configured to:

acquire flow table capability information of the switching device;

perform, according to the flow table capability information and the matching policy, policy matching on the switching device that data needs to pass through during forwarding;

generate a flow table for forwarding the data by the switching device that the data needs to pass through during forwarding;

allocate an action that needs to be executed in the flow table;

make the following adjustment to the flow table that comprises matched inport:

inport tables of all other matching policies except a matching policy for layer 2 forwarding match a DstMac field to distinguish between services when the DstMac field exists in an inport table of the switching device, a jump being performed randomly between tables;

inport tables of all matching policies need to match a same field when no DstMac field exists in the inport table of the switching device and the inport table is a wildcard match table, a smaller table identifier (ID) of a flow table entry goto indicating a higher set priority; and in an action of the flow table entry of the inport table, goto table can jump only to a next table when no DstMac field exists in the inport table, and the inport table is an exact match table; and send the flow table to the switching device that the data needs to pass through during forwarding.

9. A control method in a software-defined network (SDN), the SDN comprising at least one switching device, and the method comprising:

acquiring flow table capability information of the switching device;

setting a matching policy used to match capability information of the switching device and to acquire a flow table for forwarding data by the switching device, the matching policy comprising:

a first matching policy requiring that all requirements of the data forwarding be met and requiring that all actions required during the data forwarding be executed;

a second matching policy not requiring that all requirements of the data forwarding be met and requiring that one of the actions supported by the switching device be executed; and a third matching policy requiring that a lowest requirement of the data forwarding be met and requiring that one of the actions that needs to be executed during the data forwarding be executed;

performing, according to the flow table capability information and the matching policy, policy matching on the switching device that data needs to pass through during forwarding;

generating a flow table for forwarding the data by the switching device that the data needs to pass through during forwarding;

allocating an action that needs to be executed in the flow table; and sending the flow table to the switching device that the data needs to pass through during forwarding.

10. The control method in the SDN of claim 9, wherein generating the flow table for forwarding the data by the switching device that the data needs to pass through during forwarding comprises generating, according to a preset principle and according to the flow table capability information and the matching policy, the flow table for forwarding the data by the switching device that the data needs to pass through during forwarding, the switching device comprising at least one flow table, and the preset principle comprising at least one of the following principles:

selecting a table whose match field is completely comprised in a required match field;

selecting an exact match table prior to a wildcard match table;

selecting another table with a smallest quantity of match fields when a field that is not comprised in a matching requirement exists in the exact match table; or selecting another table with a smallest table identifier (ID).

11. The control method in the SDN of claim 9, wherein allocating the action that needs to be executed in the flow table comprises allocating, according to an order of a table identifier (ID) of the flow table, the action that needs to be completed.

12. The control method in the SDN of claim 9, wherein sending the flow table to the switching device that the data needs to pass through during forwarding comprises sending, using a FlowMod message, the flow table to the switching device that the data needs to pass through during forwarding.

13. The control method in the SDN of claim 9, wherein performing policy matching on the switching device that data needs to pass through during forwarding comprises performing matching on the flow table of the switching device according to the flow table capability information and according to an order from the first matching policy to the third matching policy.

14. The control method in the SDN of claim 9, further comprising setting priorities for delivered flow tables according to quantities of flow table entries.

15. The control method in the SDN of claim 9, wherein after the flow table for forwarding the data by the switching device that the data needs to pass through during forwarding is obtained by matching according to a capability of the switching device, the method further comprises making the following adjustment to the flow table that comprises matched inport:

inport tables of all other matching policies except a matching policy for layer 2 forwarding match a DstMac field to distinguish between services when the DstMac field exists in an inport table of the switching device, a jump being performed randomly between tables;

inport tables of all matching policies need to match a same field when no DstMac field exists in the inport table of the switching device, and the inport table is a wildcard match table, a smaller table identifier (ID) of a flow table entry goto indicates a higher set priority; and in an action of the flow table entry of the inport table, goto table can jump only to a next table when no DstMac field exists in the inport table, and the inport table is an exact match table.

16. The control method in the SDN network of claim 9, further comprising:
  generating different unified policies according to switching devices of different types, the unified policies being applicable to all switching devices of a same type; and
  generating, according to the unified policies, flow tables corresponding to the switching devices.

* * * * *